INVENTORS
MORTIMER A. SCHULTZ
IRWIN BLUESTEIN
VINCENT G. SHAW

INVENTORS
MORTIMER A. SCHULTZ
IRWIN BLUESTEIN
VINCENT G. SHAW

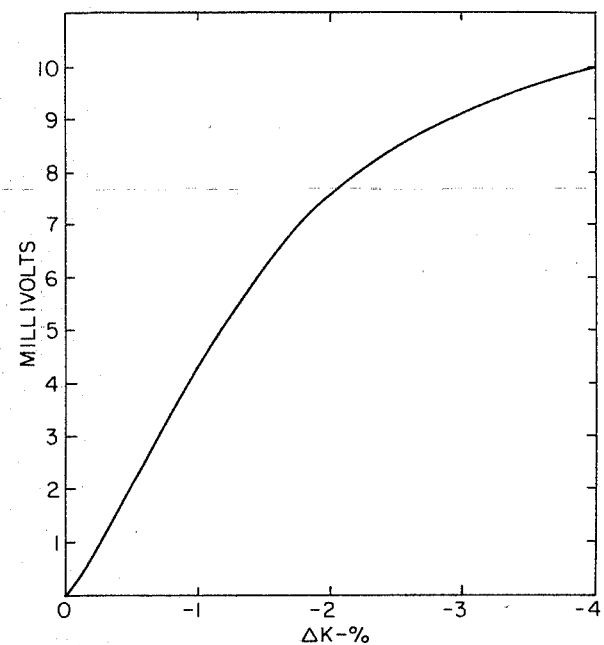
Fig. 5
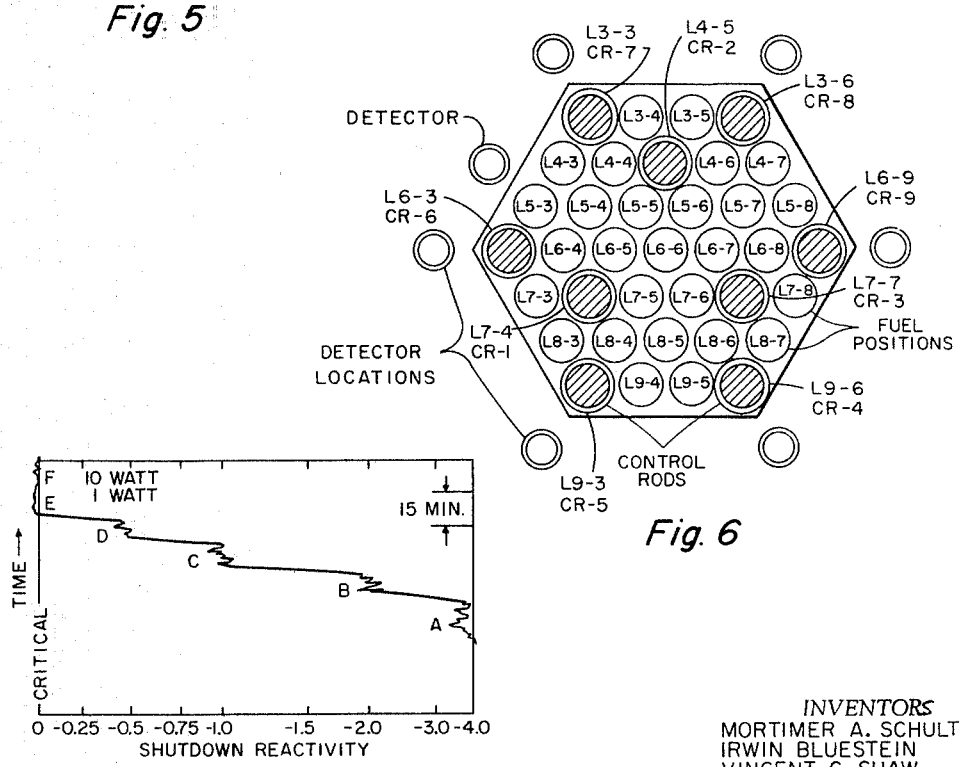
Fig. 6
Fig. 7
INVENTORS
MORTIMER A. SCHULTZ
IRWIN BLUESTEIN
VINCENT G. SHAW

INVENTORS
MORTIMER A. SCHULTZ
IRWIN BLUESTEIN
VINCENT G. SHAW 3,296,440
SHUTDOWN REACTIVITY METER FOR MEASURING THE SUBCRITICAL REACTIVITY IN A NUCLEAR REACTOR
Mortimer A. Schultz, Pittsburgh, Vincent G. Shaw, Latrobe, and Irwin Bluestein, Pitcairn, Pa., assignors to the United States of America as represented by the United States Atomic Energy Commission
Filed June 24, 1964, Ser. No. 377,786
5 Claims. (Cl. 250—83.1)

This invention relates to a shutdown reactivity meter and more particularly to a device for measuring the subcritical reactivity in a nuclear fission reactor.

When a nuclear fission reactor is nonoperational as during periods of shutdown, it is not shut off in the ordinary sense. In fact, a reactor in a state of shutdown is behaving in a manner very similar to its operational state except that neutron activity is occurring at the subcritical level. One of the reasons it is highly desirable to know the degree of reactivity in a shutdown reactor at all times is to serve as a warning that criticality is being approached. The accident which occurred in the SL-1 reactor in Idaho a few years ago in which three persons were killed might have been avoided had there been an instrument available to provide continuous subcritical measurements.

At the present time, shutdown reactivity of a reactor is measured by techniques which are complex and in one instance requires interpretation. The pulse-neutron technique which relies on an accelerator within the reactor to record decay rates of neutron bursts is very complicated. A technique involving the counting of neutrons requires interpretation. Both of these methods are unsatisfactory for a number of different reasons, and neither is capable of producing the desired result directly, automatically and continuously.

The present invention has for its purpose the measurement of reactivity in a reactor which is in a sub-critical state, with the accuracy and convenience not readily obtained by prior techniques. Briefly described, this invention relies on analysis of the noise found in the reactor core while subcritical. This noise, which can be defined roughly as fluctuations in the neutron density, is believed to be caused by the difference in time of arrival of fission neutrons at a detector, and can be measured on a more or less absolute scale. For reasons which will be explained further below, the ratio of the energy centered at a high frequency to the energy content centered at a low frequency is a direct measure of reactivity. By comparing the noise amplitudes in two suitable frequency bands, reactivity in a subcritical core can be determined.

In a preferred embodiment of this invention, an A.C. input is derived from an ion chamber which is located close to or inside the reactor core. This electrical input consists principally of white noise (i.e. noise whose energy is constant over the frequency band of interest) modified by the reactor transfer function. This noise is sometimes called correlated noise. Noises which are independent of the reactor transfer function are also usually present to some degree. A fuller explanation of terminology used in this application and an excellent analysis of noise is given in "Reactor Noise" by J. A. Thie, published in 1963 by Rowman I. Littlefield. A discussion of the reactor transfer function appears in the patent application entitled "Method and Apparatus for Determining Transfer Function of an Apparatus," Serial No. 132,341, filed on August 18, 1961, by M. A. Schultz, and which issued as U.S. Patent No. 3,240,919.

It is characteristic of a shutdown reactor that the high frequency amplitude break point of the theoretical transfer functions moves lower in frequency as criticality is approached. Thus the location of the break point in the reactor transfer function can provide direct shutdown reactivity information. As the transfer function curves for a sub-critical reactor follow definite mathematical relationships the ratio of the noise output amplitude about a frequency above the break point frequency taken with respect to the noise output about a frequency below the break point, can be expected to define the break point frequency. With proper calibration of an instrument designed to measure this ratio it is possible in accordance with this invention to indicate directly, continuously and accurately the state of reactivity of a nuclear reactor below criticality.

It is thus a first object of this invention to provide a method and apparatus for the measurement of the reactivity in a sub-critical nuclear fission reactor.

Another object of this invention is to provide for the direct measurement of the state of criticality in a nuclear reactor.

Still another object is to provide for the continuous monitoring of a nuclear reactor for the detection of subcritical neutron activity.

Still a further object of this invention is to provide for the analysis of neutron noise in a sub-critical nuclear fission reactor to determine changes in criticality.

Other objects and advantages of this invention will hereinafter become obvious from the following description of a preferred embodiment of this invention taken with the accompanying drawings in which:

FIG. 5 is a typical calibration curve for the apparatus of FIG. 4;

FIG. 6 shows the core layout and detection positions used to carry out certain experiments;

FIGS 7, 8, 9, 10 and 11 show the results of several experiments conducted to demonstrate the use and scope of the inventive apparatus.

In a nuclear fission reactor which is subcritical, that is, in which the reactivity is less than one, and a chain reaction will not be sustained, there is produced a neutron flux consisting of neutrons released as a result of the fission produced although the number is insufficient to obtain a self-sustaining reaction.

If a detector such as an ion chamber is placed within or in close proximity to the core of the reactor each neutron entering the ion chamber will produce an electrical pulse. The aggregate result of detecting a large number of these electrical pulses is an amplitude varying A.C. electrical signal reflecting the density of neutrons produced. This amplitude varying signal may be described as noise, and may be considered to consist of signals at all frequencies within the bandwidth of interest. Since the transfer function of a nuclear reactor is a frequency dependent parameter of the nuclear reactor itself, the signals or noise which are dependent on the transfer function of the reactor are often referred to as correlated noise. Uncorrelated noises which are independent of the reactor transfer functions are usually present to some degree but are small enough to be ignored in the present invention.

Figure 1:
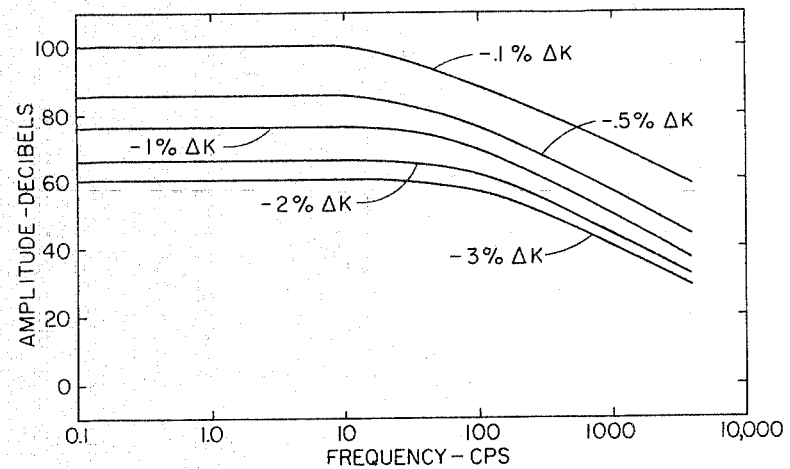
FIG. 1 shows typical transfer functions for a sub-critical reactor.

Before describing how the different transfer function characteristics are utilized to carry out the principles of this invention, reference is made to FIG. 1 wherein is shown a plot of amplitude versus frequency of noise signals for each of several different sub-critical states of a nuclear reactor. These transfer function curves each represent a ratio as defined previously of output to input signal and is given in terms of decibels. It will be noted from the curves that at lower noise frequencies there is a constant transfer function until at some higher frequency the function begins to drop off. The point of each curve at which the curve begins to drop off is the break point. It will be seen that as criticality in the reactor is approached the break point occurs at a lower frequency. Therefore, the frequency of the noise signal at which the break point occurs is, or could be, a direct indication of the state of criticality of the reactor itself when sub-critical. One way in which the break point frequency can be defined is to make a ratio of the noise output amplitude at frequencies above the break point to that at frequencies below the break point.

Figure 2:
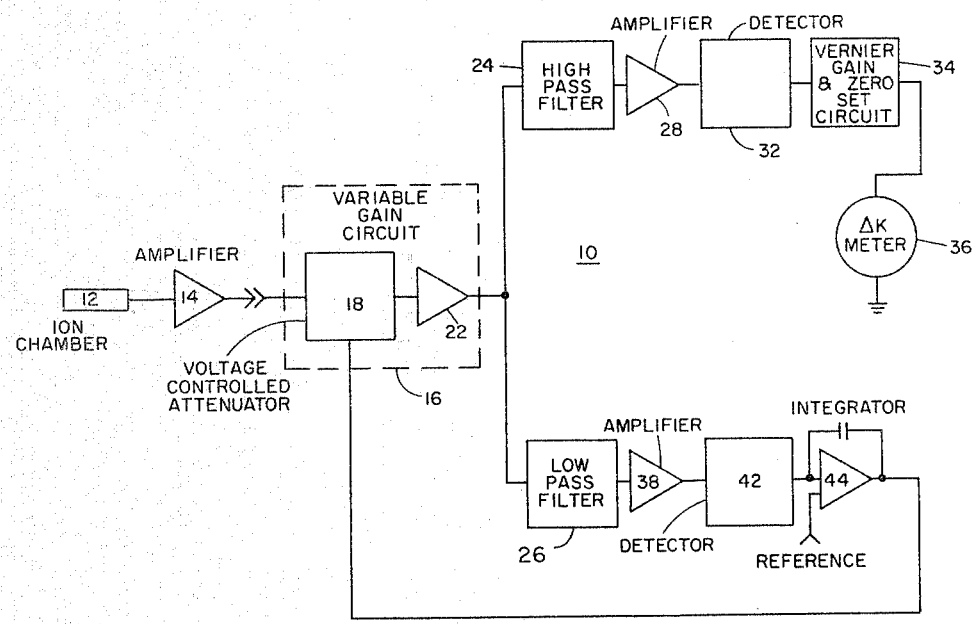
FIG. 2 is a block diagram for carrying out the principles of this invention.

To obtain this ratio, reference is made to FIG. 2 showing a block diagram of shutdown reactivity meter 10 indicating how this ratio is obtained. Meter 10 includes an ion chamber 12, an amplifier 14 for receiving the signal from chamber 12, and a variable gain circuit 16 consisting of a voltage controlled attenuator 18 and an amplifier 22. The output of amplifier 22 is passed into a high pass filter 24 and a low pass filter 26. From high pass filter 24 the signal passes through an amplifier 28, a detector 32, and a vernier gain and zero set circuit 34 to a meter 36. From low pass filter 26 the signal passes through amplifier 38, detector 42, integrator 44 and back to attenuator 18.

The arrangement shown in FIG. 2 operates as follows: The noise input to meter 10 from ion chamber 12 containing all frequencies under consideration is fed through variable gain circuit 16. The output of circuit 16 is divided into a high frequency channel (through filter 24) and a low frequency channel (through filter 26). The amplitude of the low frequency component is fed back from integrator 44 to maintain the low frequency output at a constant value with the result that the gain of the high frequency component is controlled and the amplitude of the high frequency component passing into detector 32 is in effect proportional to the ratio of the two components, and so may be used directly to indicate the subcritical reactivity in meter 36. This circuit effectively sets up the low and high frequency gains so that the low frequency signal is a constant and the high frequency signal is always examined with respect to this fixed constant. As will be seen later, meter 36 can be calibrated to read directly in terms of reactivity.

Figure 3:
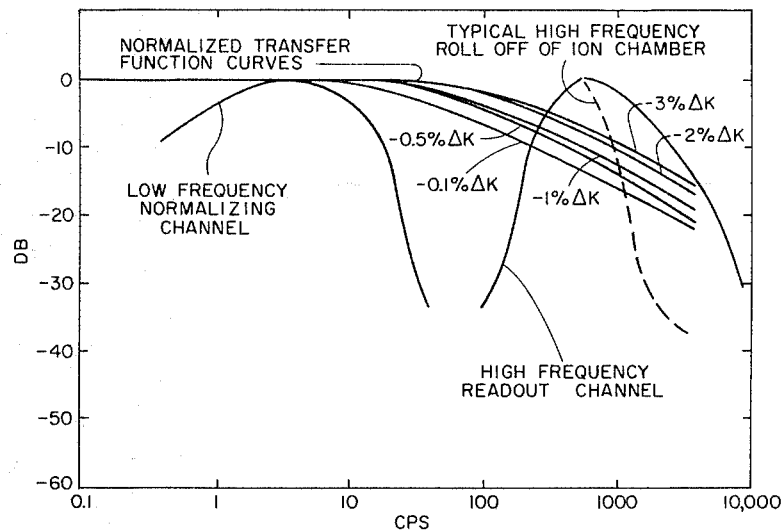
FIG. 3 shows curves demonstrating a principle of the invention.

FIG. 3 illustrates the actual frequency responses involved in the operation of meter 10. The two bandpass curves correspond to the high and low frequency channels as indicated in the graph. The actual high frequency channel is limited in response by the high frequency response of the ion chamber. Superimposed on these frequency responses are the transfer function curves taken from FIG. 1, but normalized in the low frequency bandpass. It can now be seen that the amplitude of the signal in the high frequency channel may be read directly as shutdown reactivity.

Figure 4:
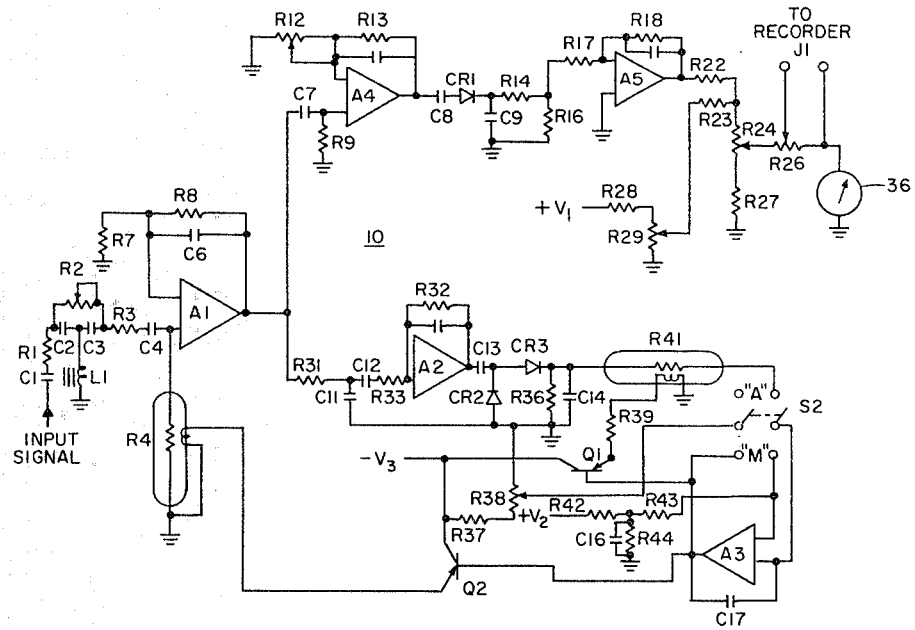
FIG. 4 is a schematic diagram of a preferred embodiment of this invention.

A schematic diagram of the shutdown reactivity meter 10 is shown in FIGURE 4, receiving the signal from amplifier 14 shown in FIG. 2. The input circuit of meter 10 consists of a 60 c.p.s. notch filter formed by capacitors C2 and C3, resistor R2, a choke L1, and a variable attenuator formed by resistors R1, R3, and R4. The variable element of this attenuator, R4 is a photoconductance cell whose resistance is an inverse function of the intensity of a light bulb which is packaged in the same container. This device provides in this embodiment a 54 db dynamic range and permits operation from large values of shutdown to critical at a level of a few watts with no gain control needed.

The variable attenuator is followed by the broadband amplifier A1. The output of amplifier A1 is routed into two channels. The component in a selected high frequency band is coupled to amplifier A4 by the highpass filter consisting of capacitor C7 and resistor R9. The output of amplifier A4 is rectified by diode CR1. The detected voltage appearing across a capacitor C9 is divided down by resistors R14, R16 and coupled to amplifier A5 by resistor R17. Amplifier A5 has a fixed gain determined by the ratio of R18 to R17 and a very low high cutoff frequency (approximately .03 c.p.s.). Since there will be a finite voltage in the output of A5 even when the reactor is critical, a zero set is obtained by summing an equal and opposite voltage at the junction of resistors R22 and R23 from a positive source V1 through a voltage dividing network consisting of resistor R28 and potentiometer R29.

A vernier gain control is provided by potentiometer R24. By placing the verner gain control after the zero set, it is possible to change the gain without affecting the zero. Potentiometer R26 is used to calibrate an auxiliary recorder (not shown) which may be connected at contacts J1.

The low frequency component band of the output of amplifier A1 is coupled by the low pass network consisting of resistor R31 and capacitor C11 to amplifier A2 through a capacitor C12 and a resistor R33. The output of amplifier A2 is rectified by diodes CR2 and CR3. The detector output which is filtered by resistor R36 and capacitor C14 is connected to one of the inputs to an integrator A3 through a variable resistor control element (photoconductance cell) R41 and an "Auto Manual" double throw, two pole switch S2. A second input to integrator A3 is a reference voltage obtained from source +V2 through a voltage divider network consisting of resistors R42, and R44. Integrator A3 will not provide a constant output voltage as long as the input voltage differs from the reference voltage provided from source +V2. The output of integrator A3 is applied via emitter follower Q2 to the input control element R4. This loop connection insures that the output of amplifier A1 always contains the same amount of low frequency energy regardless of the total signal within the frequency range of the instrument. To regulate the time constant of integrator A3, a feedback arrangement consisting of the control element R41 connected to the output of integrator A3 through a transistor Q1 and a resistor R39. Transistor Q1 is supplied from a negative source −V3. Control element R41 is also controlled by the output of the integrator A3, so that the time constant of integrator A3 is a function of its output voltage. The low frequency loop then contains a variable time constant which is dependent upon the input signal level. The reasons for providing this variable time constant are as follows: The limit of useful shutdown reactivity measurement will be reached as the ratio of uncorrelated noise to useful correlated noise approaches unity. The statistics of the noise signal are unfavorable at low power levels, thus providing fewer "samples" and, therefore, requiring more time to obtain mean values. It is clear that at large shutdown reactivity levels, a long time constant would be desirable. A five-minute time constant permits reading of shutdown reactivity values in the −5% δk class.

As criticality is approached, the amount of useful noise information is greatly increased and this long time constant is not required. In fact, a misleading answer would be obtained during transients if it were permitted. A small change in the reactivity of a slightly subcritical reactor results in a large change in noise level. For example, when the state of a reactor is changed from −0.25% δk to critical, the noise level increases sharply. If the low frequency integrator A3 cannot adjust the variable attenuator R4 rapidly enough, the high frequency channel will see the change and cause the meter to temporarily deflect in the direction of greater shutdown. Thus, at levels of reactivity near critical, the low frequency loop time constant must be faster. In this instrument, it is adjusted to be in the order of 15 seconds.

To facilitate the initial setup of the equipment, use is made of the "Auto Manual" switch S2 mentioned. With S2 in the "Manual" or "M" position, the two inputs to integrator A3 are tied together. Therefore, since no voltage difference exists at the input, the output of integrator A3 will remain at whatever voltage is present from source V3 by way of a voltage divider network consisting of resistor R37 and potentiometer R38. Thus, the output voltage of integrator A3 is controlled directly by potentiometer R38 which is the manual gain control. When the desired gain level is set, S2 is returned to the "Auto" or "A" position. Integrator A3 will initially remain at the level to which it was set since capacitor C17 was permitted to charge up. If the manually set level is incorrect, integrator A3 will move slowly to the proper value.

Shutdown reactivity meter 10 may be calibrated either from theoretical calculations, experimental data or against measured control rod worths. In a series of experiments conducted, such as those to be described below, rod worth data was available from prior experiments and the meter was consequently calibrated against this data. FIG. 5 illustrates the output calibration curve used. It will be noted that the meter scale is approximately linear down to about $-1.5\%$ $\delta k$. Because a theoretical calibration would depend upon the reactor-detector geometry, FIG. 6 is provided to illustrate the core layout and detector position in the reactor where all of the experiments were conducted. The reactor used was the Critical Experiment Station (CES) reactor of Westinghouse located at Waltz Mills, Pa.

The following experiments were conducted to demonstrate this invention and to indicate its application:

A. Banked rod measurements

Typical results of shutdown reactivity measurements against banked rod reactor operation are shown in FIGURE 7. In this experiment, the control rods were successively moved to previously calibrated bank positions and the output voltage trace observed on a recorder. The reactor was held at each of the following bank positions and the output voltage trace observed on a recorder. The reactor was held at each of the following bank positions for approximately ten minutes: (A) $\delta k = 4\%$; (B) $\delta k = -2\%$; (C) $\delta k = -1\%$; (D) $\delta k = -0.5\%$; (E) critical at 1 watt; (F) critical at 10 watts. It will be noted that the instrument gives the same reading at critical without regard to the power level. If the transition between power levels is in a positive direction and accomplished slowly, no transient meter deflection will occur. If the reactor power is changed upward on a fast period, a temporary deflection will occur. For example, in FIGURE 8 at chart position (B), the reactor was taken from critical at 1 watt to critical at 5 watts on a fast (18 sec.) period. It can be seen that a sharp meter deflection in the proper direction is indicated. Ultimately, of course, the reading will return to zero.

B. Control rod configurations and shadowing effects

Figure 8:
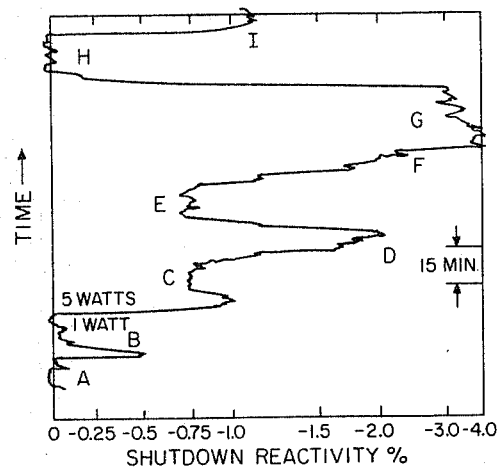
Figure 10:
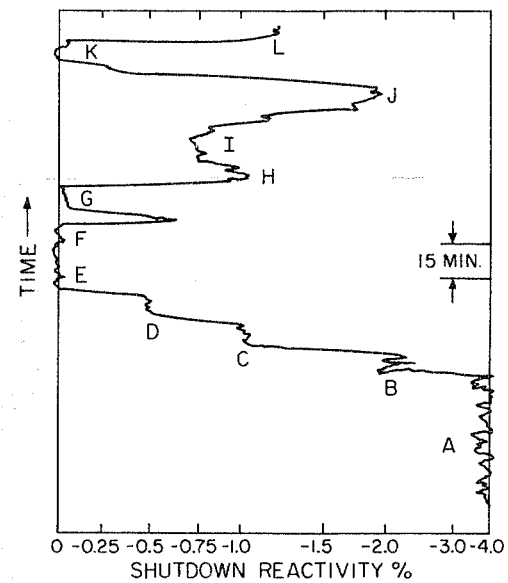

Experiments such as shown in FIGURE 7 indicate that the shutdown reactivity meter is insensitive to the power level under rod banked conditions at critical. It was desired to learn if the instrument would prove sensitive to the configuration of the control rods. In FIGURE 8, the reactor was first taken to critical with banked rods (shown on chart position A). The center three control rods were inserted approximately two inches each into the core and the remaining six outside control rods were pulled until the reactor was again critical at 1 watt (chart position B). It can be seen that very little difference is indicated on the meter. At position H on FIGURE 8, the reactor was later critical at 5 watts with control rod #4 completely out of the core and the remainder of the rods banked. Similar experiments are indicated in FIGURE 10. Here, chart positions F, G and K represent a critical reactor with different control rod configurations. In all cases, the meter read correctly at critical without regard to the controlled positions.

C. Subcritical rod worth measurements

The purpose of this experiment was to show how this instrument could be used to calibrate the worth of control rods without first going critical, and to examine the effects of rod shadowing in the subcritical reactor.

The first run is shown in FIGURE 8. The reactor was originally set up with all control rods banked at $-1\%$ $\delta k$. Then control rod #4, which is furthest away from the detector, was pulled out of the core at chart position C. This control rod was then inserted into the reactor in five equal steps remaining at each step for three-minute intervals until the rod was fully inserted at position D.

It will be recalled that the instrument can have a time constant of up to five minutes. Therefore, to obtain accurate data, much more time should have been taken at each step. However, to indicate crudely the measurement principle, the observed data is listed in Table I.

TABLE I

| Percent of rod in core: | Meter reading-reactivity (percent) |
| --- | --- |
| 0 | −0.75 |
| 20 | −0.75 |
| 40 | −0.80 |
| 60 | −1.20 |
| 80 | −1.75 |
| 100 | −1.90 |

Figure 9:
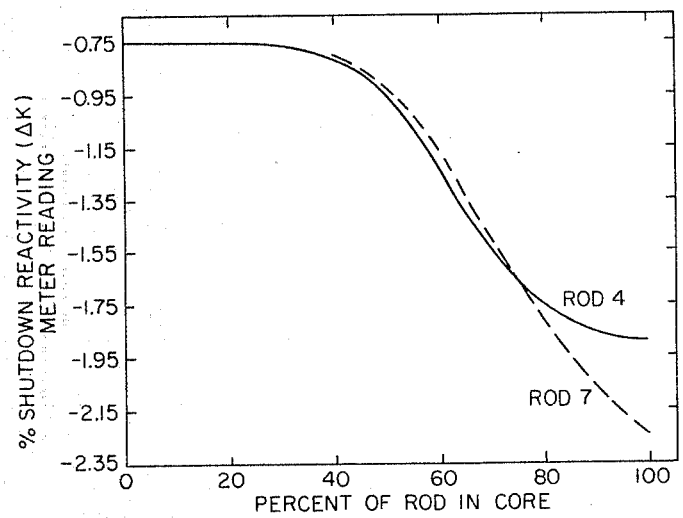

The same experiment was then repeated with control rod #7, a rod with presumably the same worth as #4. Rod #7, however, is located adjacent to the neutron detector. The results of this run are shown in FIGURE 8, chart positions E and F. These results are further tabulated in Table II and shown graphically on FIGURE 9.

TABLE II

| Percent of rod in core: | Meter reading-reactivity (percent) |
| --- | --- |
| 0 | −0.75 |
| 20 | −0.75 |
| 40 | −0.80 |
| 60 | −1.15 |
| 80 | −1.80 |
| 100 | −2.25 |

From this data, the detector position with respect to the control rod makes appreciable difference only at large values of subcriticality.

In FIGURE 10, chart positions I to J, the same experiment was repeated several days later using control rod #4. A total rod worth of 1.15% is again noted indicating good meter repeatability.

D. Rod drop test

Another method of measuring rod worth is to start from a critical configuration and then drop a rod through its full travel. The magnitude of the neutron level as a function of time after rod drop is a direct measurement of the negative reactivity inserted during the drop. Consequently, a reactivity reading can be calculated from the reactor's normal control instrumentation and compared with the shutdown reactivity meter reading.

The rod worth calculated from the neutron level instrumentation transient was 1.08%.

E. Fuel element worth

The following experiment was performed to measure the reactivity of individual fuel elements.

(1) The control rods were first banked with the reactor critical at 5 watts and the control rod positions were recorded.

(2) The reactor was completely shutdown and a fuel element was removed.

(3) The control rods were returned to their previous banked position and the reading noted on the shutdown reactivity meter.

(4) Steps 1 through 3 were repeated removing additional elements until it was impossible to bring reactor critical.

The following fuel elements were sequentially removed in the experiment:

Step 1a ........................................... L6–6
Step 2a ........................................... L9–4
Step 3a ........................................... L9–5
Step 4a ........................................... L8–4
Step 5a ........................................... L8–5
Step 6a ........................................... L8–6

Figure 11:
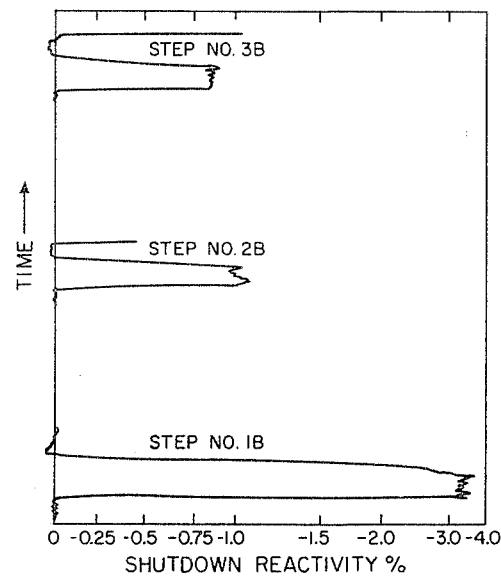

In FIGURE 11 (Step 1a), the control rods were first banked at the position where the reactor would be critical if fuel element L6–6 were in place. Thus, from FIGURE 11, the following fuel elements worth were noted.

|      | Measured worth (percent) |
|------|--------------------------|
| L6–6 | 3.2 |
| L9–4 | 1.0 |
| L9–5 | 0.87 |
| L8–4 | 1.3 |
| L8–5 | 1.5 |
| L8–6 | 1.2 |

As fuel element L6–6 is in the center of the reactor and the other elements are close to the edge, the larger worth of the center element is most reasonable.

On the basis of the experiments accomplished, the following conclusions may be reached.

(1) The shutdown reactivity meter as designed makes a reliable safety monitor for cold, clean reactors. The instrument is most sensitive near cirtical and maintains its repeatability over long periods of time. The instrument may easily be equipped with an alarm to indicate any unexpected rise in reactivity.

(2) It has been demonstrated that the instrument is also capable of performing physics experiments that could not previously be performed easily in a subcritical reactor. For example, the worth of individual control rods may be measured in a subcritical reactor as well as in a critical reactor. Any combinations of control rods may be evaluated in a critical or subcritical reactor, and the instrument may be used to monitor and evaluate each step of a fuel loading operation.

(3) Once the instrument is calibrated, it is relatively insensitive to control rod positions and reactor configurations. It is particularly accurate at, or slightly below critical.

It is thus seen that the shutdown reactivity meter of this invention has certain significant advantages over prior methods and devices utilized to make criticality measurements in a sub-critical reactor. First, the inventive arrangement is a relatively simple device and hence of lower cost than previous methods and arrangements. Further it is accurate, direct reading and continuous reading thereby eliminating the complex calculations, estimates, judgements and the resulting time lags inherent in the previous ways of obtaining this information.

While only a preferred embodiment of this invention has been described, it is understood that various changes may be made without departing from the principles of this invention and that the invention is to be defined only by the scope of the appended claims.

We claim:

1. A shutdown reactivity meter for use with a nuclear fission reactor in a subcritical state comprising means for producing an A.C. signal modulated by variations in the neutron density adjacent the core of said reactor, means for passing a high frequency band of frequencies in said signal and detecting same, means for passing a low frequency band of frequencies in said signal and detecting same, means in response to the amplitude of the detected signal in the low frequency band to regulate the gain of said A.C. signal to maintain an unvarying amplitude in the detected low frequency signal, and means in response to the amplitude of the detected signal in the high frequency band to indicate directly the reactivity of said reactor.

2. The shutdown reactivity meter of claim 1 in which the regulating means includes means to integrate the low frequency band signal and to compare the result with a reference voltage.

3. A shutdown reactivity meter for use with a nuclear fission reactor in a subcritical state comprising means for producing an A.C. signal modulated by variations in the neutron density adjacent the core of said reactor, adjustable first means for attenuating said signal, means for amplifying the attenuated signal, means for passing and amplifying a high frequency band component of the amplified signal, means for passing and amplifying a low frequency band component of the amplified signal, adjustable second means for attenuating the amplified low frequency band signal, means for integrating the attenuated low frequency band signal, means in response to the integrated low frequency band signal to adjust automatically the first attenuating means to increase the attenuation of the modulated A.C. signal to maintain the low frequency band signal amplitude at a substantially constant value and thereby to vary said high frequency band signal in accordance with the ratio of the high frequency band signal amplitude to the low frequency band signal amplitude, and means responsive to the amplified high frequency band signal to indicate directly the state of reactivity of said nuclear reactor.

4. The apparatus of claim 3 in which the second attenuating means is responsive to the output of said integrating means to increase the attenuation of the low frequency band signal as the output of said integrating means increases to decrease the time constant of the meter as criticality of the reactor approaches unity.

5. The apparatus of claim 4 having means to override the means to adjust the first attenuating means and to permit manual gain control instead.

References Cited by the Examiner

UNITED STATES PATENTS 2,932,743  4/1960  Atwood _____ 250—83.6 X
3,069,545  12/1962  Lide et al. _____ 250—83.1

References Cited by the Applicant

C. E. Cohn, "Determination of Reactor Kinetic Parameters by Pile Noise Analysis," Nuclear Science and Engineering, 5, May 1959, pp. 331–335.

C. E. Cohn, "Determination of Reactor Zero Power Kinetic Parameters by Flux Noise Analysis," pp. 308–318, and the "Discussion of Paper," particularly p. 322.

J. A. Thie, "Statistical Analysis of Power-Reactor Noise, Nucleonics, 17, No. 10, October 1959.

R. E. Skinner and D. L. Hetrick, "The Transfer Function of a Water Boiler Reactor," Nuclear Science and Engineering, 3, No. 5, May 1958, pp. 573–594.

ARCHIE R. BORCHELT, *Primary Examiner.*